May 21, 1929.  L. R. N. CARVALHO  1,713,948
JAR CLOSURE
Filed Oct. 7, 1926
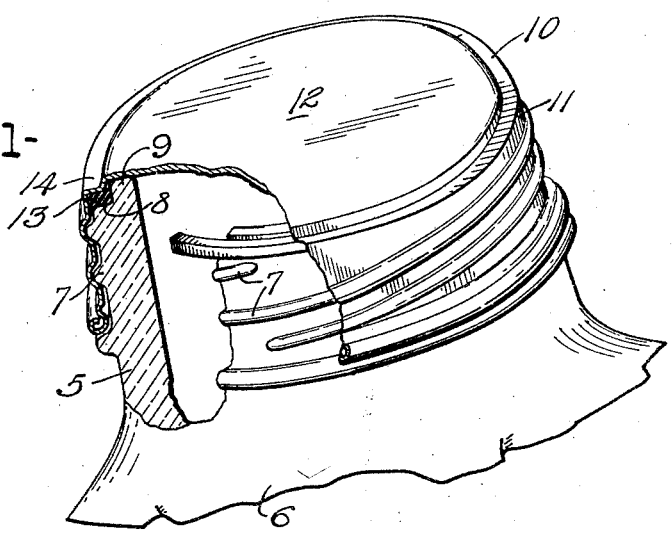
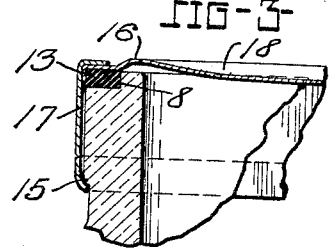
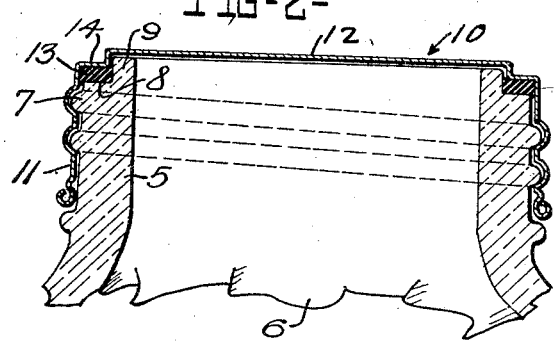
INVENTOR
*L.R.N.Carvalho*
BY *J.F.Rule*
HIS ATTY.

Patented May 21, 1929.

1,713,948

UNITED STATES PATENT OFFICE.

LESLIE R. N. CARVALHO, OF TOLEDO, OHIO, ASSIGNOR TO THE CLOSURE SERVICE COMPANY, OF TOLEDO, OHIO, A CORPORATION OF OHIO.

JAR CLOSURE.

Application filed October 7, 1926. Serial No. 140,027.

The present invention relates to improvements in closures for jars or the like containers.

An object of the present invention is to provide means for sealing jars and the like containers in such a manner that both side and top seals are obtained. To this end, the finish of the neck of a jar or other container has its outer corner cut away to form an annular recess to receive a sealing gasket. The closure, which may be attached to the container in any preferred manner, exerts a downward pressure upon a sealing gasket arranged in the recess and expands the gasket radially inward, forming a side seal, and due to the pressure of the closure upon the gasket a top seal is created.

An outstanding advantage of this top and side seal resides in the elimination of imperfect sealing resulting from defective finishes on the jars, or from unequal or excessive pressure which quite frequently results in destruction of the seal as by cutting through the rubber or other composition.

In the accompanying drawings:

Fig. 1 is a perspective view, partly in section, showing my improved seal.

Fig. 2 is a vertical sectional view illustrating the invention.

Fig. 3 is a fragmentary section showing the seal used on a "Save-a-Seal" type of closure.

Referring to the drawings and particularly to Figs. 1 and 2, the neck 5 of a jar is formed with external threads 7 and with an annular exterior recess or channel 8 created by omitting the outer corner of the finish or sealing end of the neck. The recess opens through the upper end of the finish and radially through the neck portion and is adapted to form a seat for a composition sealing element. Preferably, the annular recess is rectangular in cross section to provide flat right angularly disposed sealing surfaces. This formation of the annular recess incidentally provides an upstanding annular rib 9 around which the sealing gasket is placed and retained in proper position for sealing.

The closure 10 is formed with a threaded depending flange or skirt 11 formed at a right angle to the top portion, the threads being adapted to engage the threads formed on the neck of the jar to fasten the closure upon the container. At the juncture of the top portion 12 and skirt portion 11 of the closure, the metal is shaped to provide a flat seal engaging and compressing shoulder or rib 14. Between this shoulder and the bottom of the annular recess, the sealing ring 13 or gasket is arranged. The gasket 13 may be made of black rubber or composition or other comparatively inexpensive material, as the method of forming a combined top and side seal and confining the sealing material as herein disclosed, permits an effective seal to be obtained without the use of pure rubber or expensive plastic compositions such as have been found necessary with the usual sealing methods.

Application of the closure in the manner shown in Figs. 1 and 2, exerts a downward pressure upon the sealing gasket 13, causing inward and outward radial expansion of the gasket into snug engagement with the skirt 11 of the closure and outer wall of the aforementioned annular rib 9, thereby forming an effective side seal. The downward pressure employed in effecting this side seal also causes snug engagement of the upper and lower surfaces of the sealing gasket 13 with the closure and bottom wall of the annular exterior recess. Thus, it is seen that both side and top seals are provided in a single closure. Because of the fact that the sealing gasket is entirely enclosed on all sides and the walls are arranged at right angles to each other, it is evident that even though excessive pressure is applied, such pressure will be uniformly distributed and the sealing gasket 13 will not become broken or injured in a manner to destroy its sealing qualities as has been experienced heretofore in many instances.

In Fig. 3, I have shown my invention applied to a jar or bottle having a neck portion provided with an exterior annular shoulder 15 by means of which a cap 16 is secured in sealing position, this form comprising a portion of the subject matter of my co-pending application Serial No. 173,039, filed March 5, 1927, and claim therein. The cap in this instance is of the "Save-a-Seal" type in which the flange or retaining ring 17 has its lower edge portion turned inwardly over the shoulder 15 to compress the sealing gasket and releasably hold the top portion 18 of the closure in proper position.

Manifestly, certain changes may be resorted to within the spirit and scope of the appended claims.

What I claim is:

1. The combination of a container having an externally screw threaded neck, the upper portion of the neck having its outer corner cut away above the threaded portion to form an annular recess surrounding said neck, said recess providing a horizontally disposed flat annular sealing surface and a vertical sealing surface extending from said horizontal surface to the upper surface of the neck, a ring gasket of soft compressible material seated in said recess, said gasket being rectangular in cross section and having a lower face seated on the horizontal surface of said recess, and a vertical face bearing against said vertical face of the recess, the upper surface of said gasket being about flush with the uppermost surface of the container, and a cap attached to the container, said cap having a top portion in close proximity to but out of bearing engagement with the upper surface of the container, the peripheral portion of said top being offset downwardly and in its entirety seated on said gasket, said cap having a screw threaded flange portion engaging the screw threads on the container, said flange portion having a vertical sealing surface engaging the outer vertical face of the gasket, said gasket being held under compression caused by screwing the cap into position on the container, the entire downward pressure of the cap being applied to said gasket.

2. The combination of a container having an externally screw threaded neck, the upper portion of the neck having its outer corner cut away above the threaded portion to form an annular recess surrounding said neck, said recess providing a horizontally disposed flat annular sealing surface and a vertical sealing surface extending from said horizontal surface to the upper surface of the neck, a ring gasket of soft compressible material seated in said recess, said gasket being rectangular in cross section and having a lower face seated on the horizontal surface of said recess, and a vertical face bearing against said vertical face of the recess, the upper surface of said gasket being about flush with the uppermost surface of the container, and a cap attached to the container, said cap having a top portion in close proximity to but out of bearing engagement with the upper surface of the container, the peripheral portion of said top being seated on said gasket, said cap having a screw threaded flange portion engaging the screw threads on the container, said flange portion having a vertical sealing surface engaging the outer vertical face of the gasket, said gasket being held under compression caused by screwing the cap into position on the container, the entire downward pressure of the cap being applied to said gasket, the top of the cap having said peripheral portion thereof which seats on the gasket offset downward a short distance, thereby forming a flat annular rib providing a sealing surface in engagement with the upper surface of the gasket.

3. The combination of a container having the outer corner of its upper end cut away to form an annular recess surrounding said end, said recess providing a pair of meeting right angularly disposed sealing surfaces, a compressible sealing ring seated in said recess, said ring rectangular in cross-section and having horizontal and vertical sealing surfaces contacting with the surfaces of the recess, and a closure for the container, said closure having a top portion out of bearing engagement with the upper end of said container, a downwardly offset flat rib formed at the periphery of said top portion adapted for contact with the horizontal upper surface of the sealing ring, and means to attach the closure to the container and uniformly compress said sealing ring without effecting bearing engagement between the top portion of the closure and said upper end of the container.

Signed at Toledo, in the county of Lucas and State of Ohio, this 30th day of September, 1926.

LESLIE R. N. CARVALHO.